United States Patent
Keane et al.

[11] Patent Number: 5,894,994
[45] Date of Patent: *Apr. 20, 1999

[54] ADJUSTABLE SLOT COATING DIE

[75] Inventors: John J. Keane, Alpharetta; Richard E. Leeds, Jr., Snellville, both of Ga.; Charles H. Scholl, Marina, Calif.

[73] Assignee: Nordson Corporation, Westlake, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/571,363

[22] Filed: Dec. 12, 1995

Related U.S. Application Data

[63] Continuation-in-part of application No. 08/404,167, Mar. 14, 1995, Pat. No. 5,622,315.

[51] Int. Cl.[6] .............................. B05B 1/04; B29C 47/14
[52] U.S. Cl. .............................. 239/134; 239/451; 239/597; 239/600
[58] Field of Search .............................. 239/600, 597, 239/133–138, 451, 455; 118/410, 411

[56] References Cited

U.S. PATENT DOCUMENTS

| | | |
|---|---|---|
| 4,200,207 | 4/1980 | Akers, et al. . |
| 4,687,137 | 8/1987 | Boger et al. . |
| 5,294,258 | 3/1994 | Jarrell et al. . |
| 5,622,315 | 4/1997 | Keane et al. ............ 239/597 X |

OTHER PUBLICATIONS

"The Flat Out Best!", Chippewa Valley Die, Inc. Product Line Brochure (6 pages).

*Primary Examiner*—Kevin Weldon
*Attorney, Agent, or Firm*—Calfee, Halter & Griswold LLP

[57] ABSTRACT

A slot coating die (10) is provided, comprising an upper die half (12) and a lower die half (14) attached together with a shim (16) disposed therebetween, each die half extending along an axis (18) and having a front and a back. The front of the upper die half includes a movable lip insert (22) extending substantially the entire width thereof and movable with respect to the upper die half toward and away from the front of the upper die half in a direction generally perpendicular to the axis. At least one adjustable die opening (20), which is adjustable independently of the movable lip insert, is defined by the upper and lower die halves and the shim plate disposed therebetween. A plurality of push-pull bolts (30) provide a coarse adjustment mechanism for adjusting the relative positions of the lower and upper die halves with respect to each other in a direction generally parallel to that in which the movable lip insert may be moved. A plurality of springs (128) loaded screws (124) spaced along the width of the upper die half provide a fine adjust mechanism by which the lip insert is made movable in that direction.

10 Claims, 13 Drawing Sheets

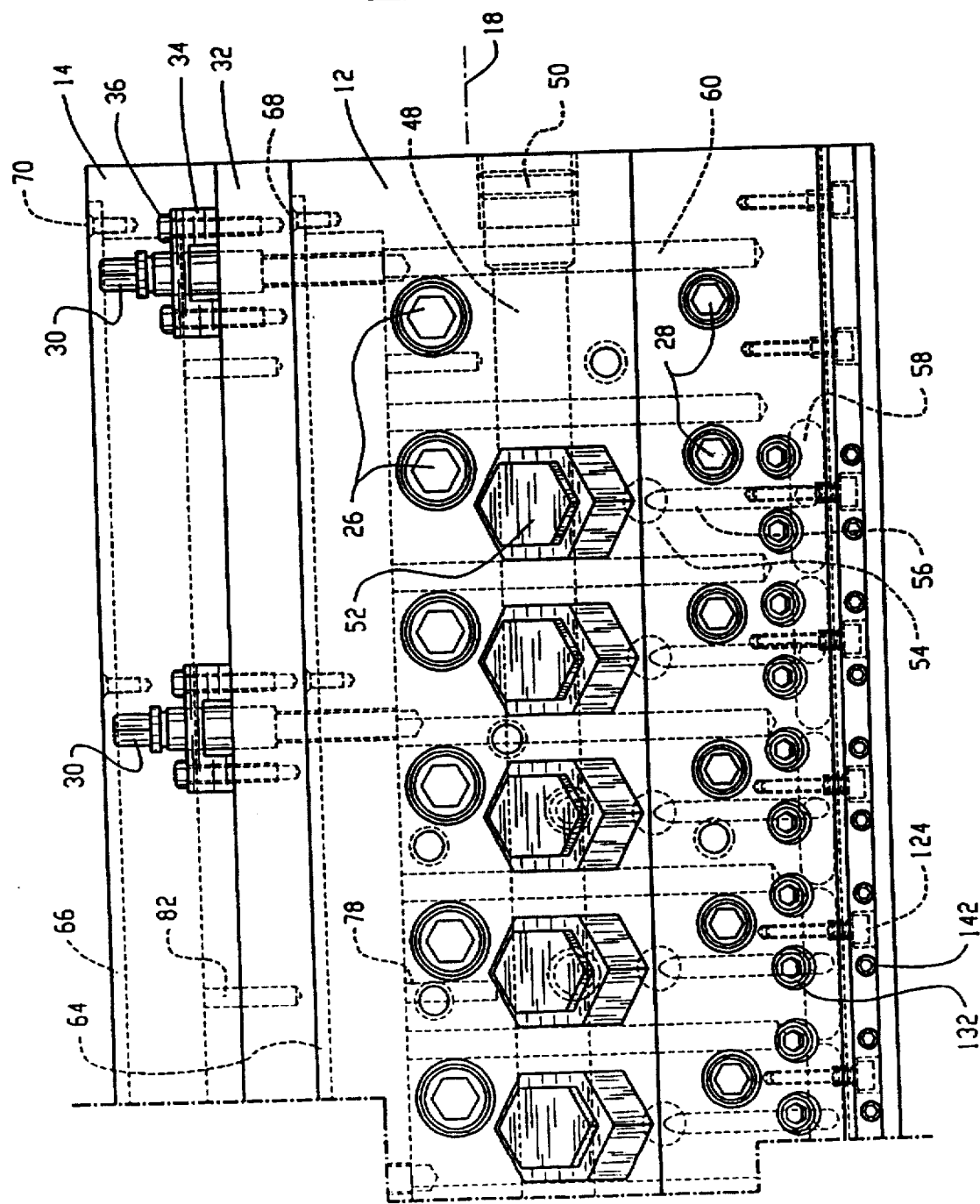

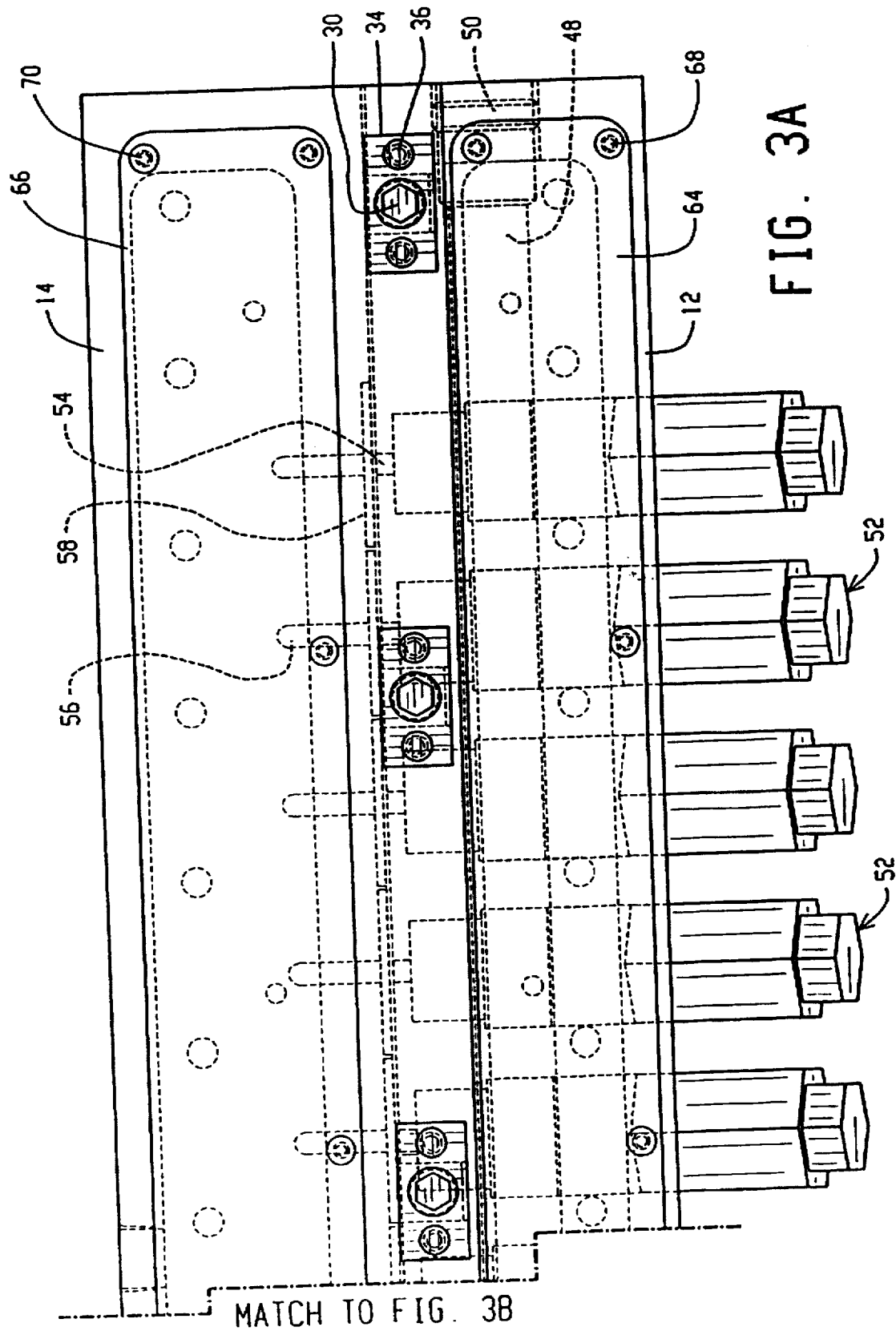

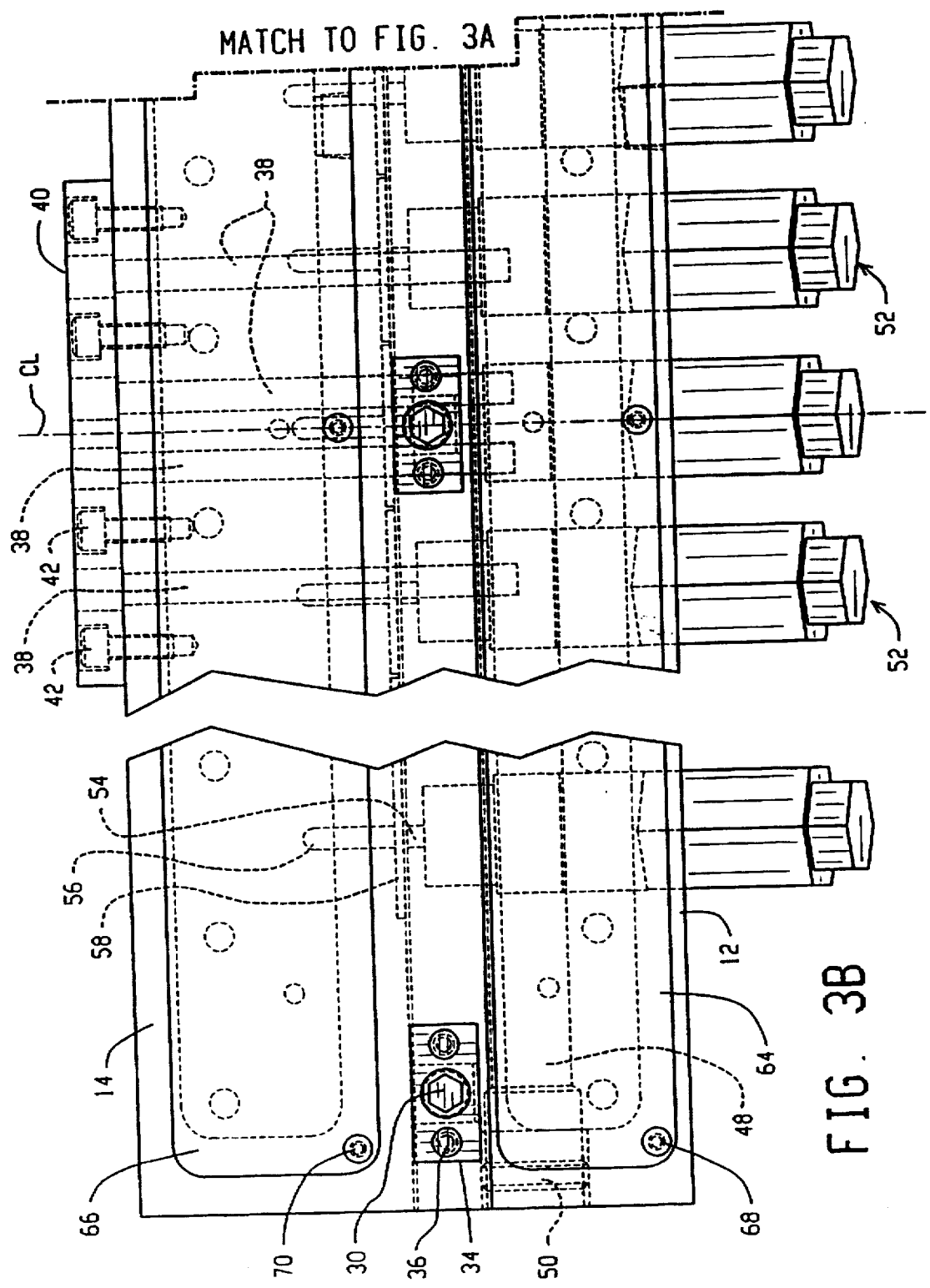

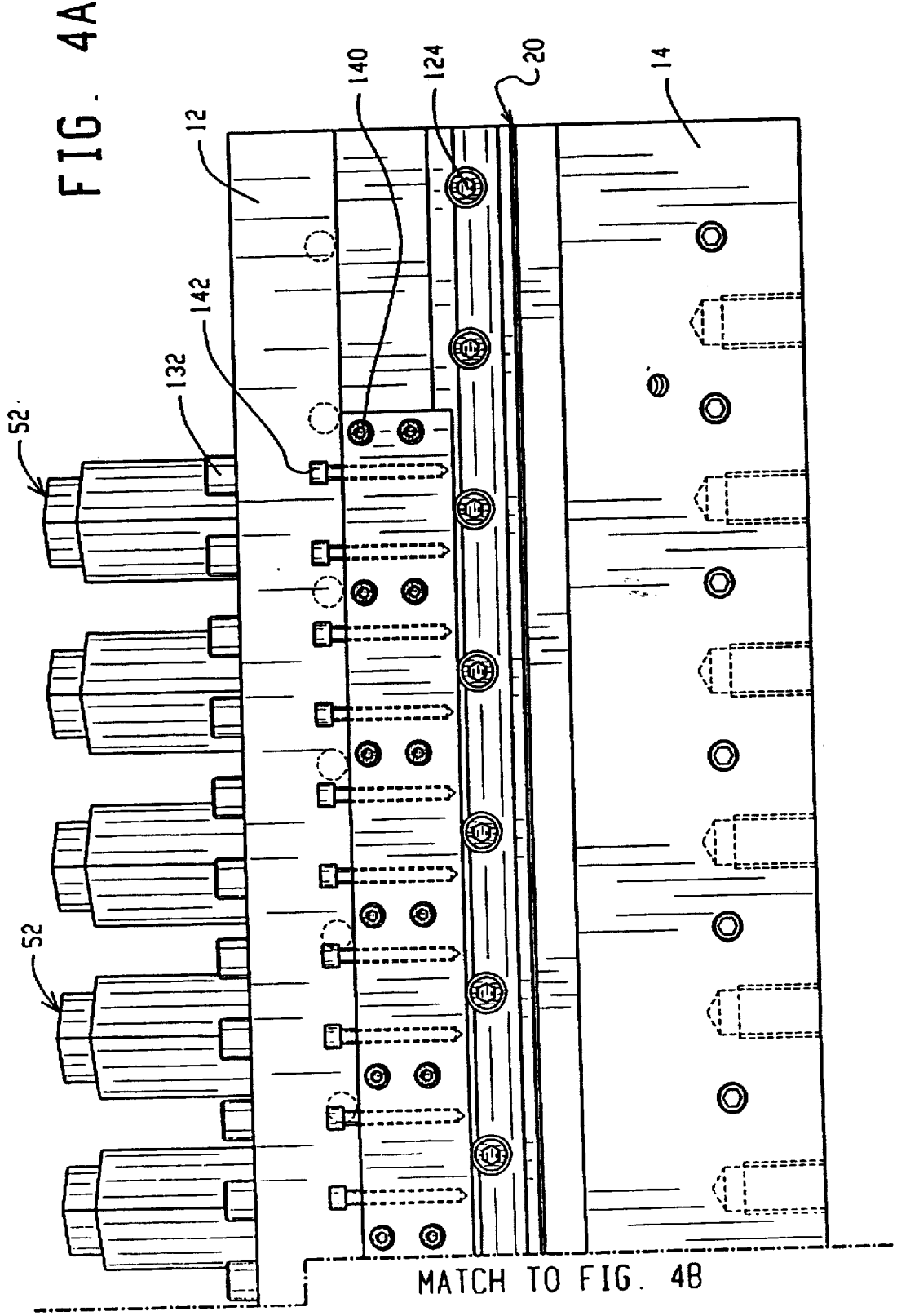

5,894,994

ADJUSTABLE SLOT COATING DIE

This application is a continuation in-part of U.S. patent application Ser. No. 08/404,167 filed Mar. 14, 1995 now U.S. Pat. No. 5,622,315.

TECHNICAL FIELD

The present invention relates generally to slot coating dies and more particularly to an adjustable slot coating die providing means to adjust the flow characteristics of the die slot independently of a doctoring surface of the die.

BACKGROUND OF THE INVENTION

Hot melt material application devices incorporating slot-type dies are known. Such devices are typically used to continuously apply a coating to a substrate which passes over a coating surface of the die head. Designs for such slot dies must insure that (i) the hot melt material is evenly redistributed from the surface of the die head to the surface of the substrate being coated and (ii) the configuration of the doctoring, or finishing, surface of the die head is carefully controlled.

Controlled redistribution of the hot melt material from the die head surface to the substrate surface is typically accomplished by means of the design of the internal flow passages of the die. Generally, two types of internal flow passage designs are known. The so-called coat hanger dies (e.g. U.S. Pat. No. 4,687,137, assigned to the assignee of the present invention) utilize complex internal machined surfaces which permit the hot melt material to flow from the die head to the substrate in a uniform manner. However, utilizing this type of arrangement generally limits the applications of the die to a limited number of coating widths, and to certain ranges of hot melt material flow and viscosity.

T-slot dies have also experienced widespread use in the industry (see e.g. U.S. Pat. No. 5,294,258, also assigned to the assignee of the present invention). Typically these types of dies can accept a wider range of hot melt material types than coat hanger dies. In addition, T-slot dies may be used for applying varying amounts of hot melt material by merely by changing shim plates on the device. However, known T-slot dies are not as efficient as coat hanger dies in evenly internally distributing the hot melt material from within the die head to the doctoring surface.

Moreover, both known T-slot and known coat hanger dies provide limited control over the configuration of the doctoring surface of the die head to accommodate for variations in the doctoring surface of the die or the surface of the back up roll, or cross-machine variations in the thickness of the substrate being coated. To insure consistent distribution of the hot melt material across the substrate, means for adjusting the configuration of the doctoring surface must be provided. These adjustment means must be durable and wear-resistant in order to be repeatedly operable with precision over the life of the die.

Accordingly, it is an object of the present invention to provide a die having a head which provides both the even internal flow distribution of a coat hanger die and the flexibility of application and coating width variation a T-slot die. It is an additional object of the invention to provide such a die which will accommodate variations in the doctoring surface of the die, the surface of the back up roll, and the thickness of the substrate.

SUMMARY OF THE PRESENT INVENTION

An adjustable slot coating die is provided which comprises upper and lower die halves secured together and having a replaceable shim of varying thickness therebetween. The thickness of the shim determines the thickness of a die opening through which hot melt material may be dispensed or extruded. The upper and lower halves of the die are disposed in a generally parallel relationship with respect to one another along an end-to-end axis of the die which lies in the plane of the shim.

A removable lip insert or mouthpiece is installed at a front of the upper die half. The frontmost portion of the mouthpiece forms a doctoring surface which works, or doctors, the finish and thickness of the hot melt material as it is being applied to a substrate or web. A series of push-pull bolts are located at the rear of the die for adjusting the relative position of the upper half of the die, and thus the mouthpiece, with respect to the substrate. Selective and independent operation of individual push-pull bolts effects a coarse adjustment of the contour of the doctoring surface of the mouthpiece along the entire end-to-end width of the die.

A supply of hot melt material is provided to the lower die half and communicated across the shim to a cross channel extending the entire end-to-end width of the upper die half. A series of adjustable valve assemblies located at spaced apart locations on the cross channel balance the distribution of hot melt material across exit ports in the upper die half, to T-slots in the lower die half which are formed by elbow-channels which terminate in elongated slots with rounded ends. Hot melt material flows through the series of adjacent T-slots and through the die opening to provide an evenly distributed flow of hot melt material across the opening. In addition to determining the thickness of the die opening, the shim provides means by which the flow of hot melt material present at the T-slots may be selectively blocked to provide a predetermined pattern or variable width of hot melt material flow at the die opening.

The adjustable mouthpiece is secured to the upper die half by means of a series of threaded screws which are provided with springs which are placed under compression when the screws are tightened. When under compression, the compressive force exerted by the springs forces the mouthpiece into contact with the upper die half. A series of screws having tapered, friction-resistant end elements are used to finely adjust the position of the mouthpiece with respect to the substrate or web being coated. Preferably, the tapered end elements are sleeves which slide over the ends of the screws and which are coated with a friction-resistant material. The sleeves mate with the back end of the mouthpiece. Rotation of any of the screws causes the friction-resistant end element to counteract the compressive force exerted by a corresponding spring, thereby forcing the lip insert away from the die at the location of that particular screw.

BRIEF DESCRIPTION OF THE DRAWINGS

FIGS. 2A and 2B, taken together, form a side view of the adjustable slot coating die of FIG. 1;

FIGS. 3A and 3B, taken together, form a back view of the adjustable slot coating die of FIG. 1;

FIGS. 4A and 4B, taken together, form a front view of the adjustable slot coating die of FIG. 1;

DETAILED DESCRIPTION OF THE PREFERRED EMBODIMENT

Figure 1:
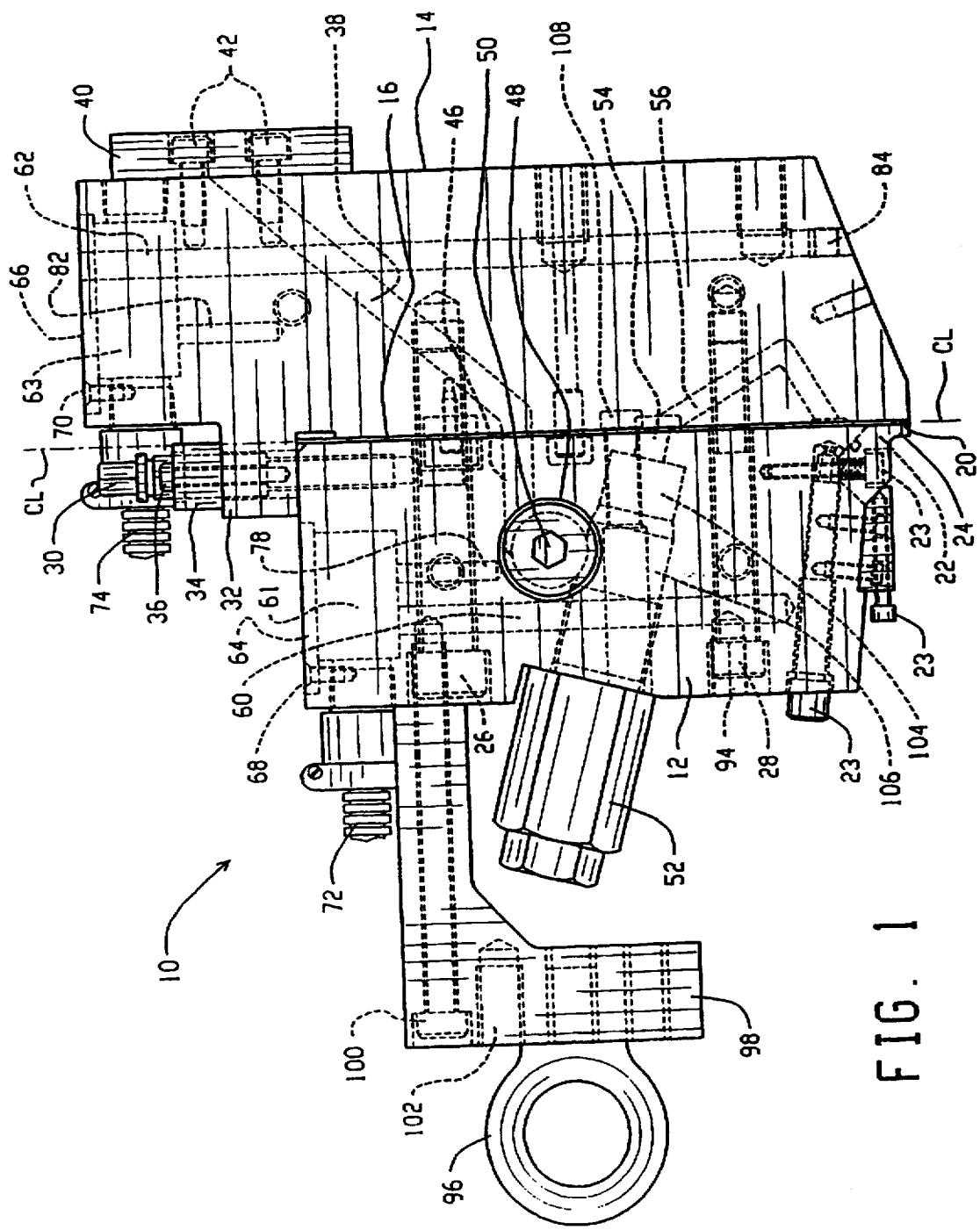
FIG. 1 is an end view of an adjustable slot coating die constructed according to the principles of the present invention, showing upper and lower die halves.

Referring now to the drawings, FIGS. 1 through 4 show various views of an adjustable slot coating die 10 constructed according to the principles of the present invention. Beginning with FIG. 1, an end view of the slot coating die 10 is shown. The die 10 comprises a upper die half 12 and a lower die half 14 separated by a distance equal to the predetermined thickness (e.g., 0.005"–0.032") of a shim 16 disposed therebetween (see also FIGS. 5A–5B).

Figure 2B:
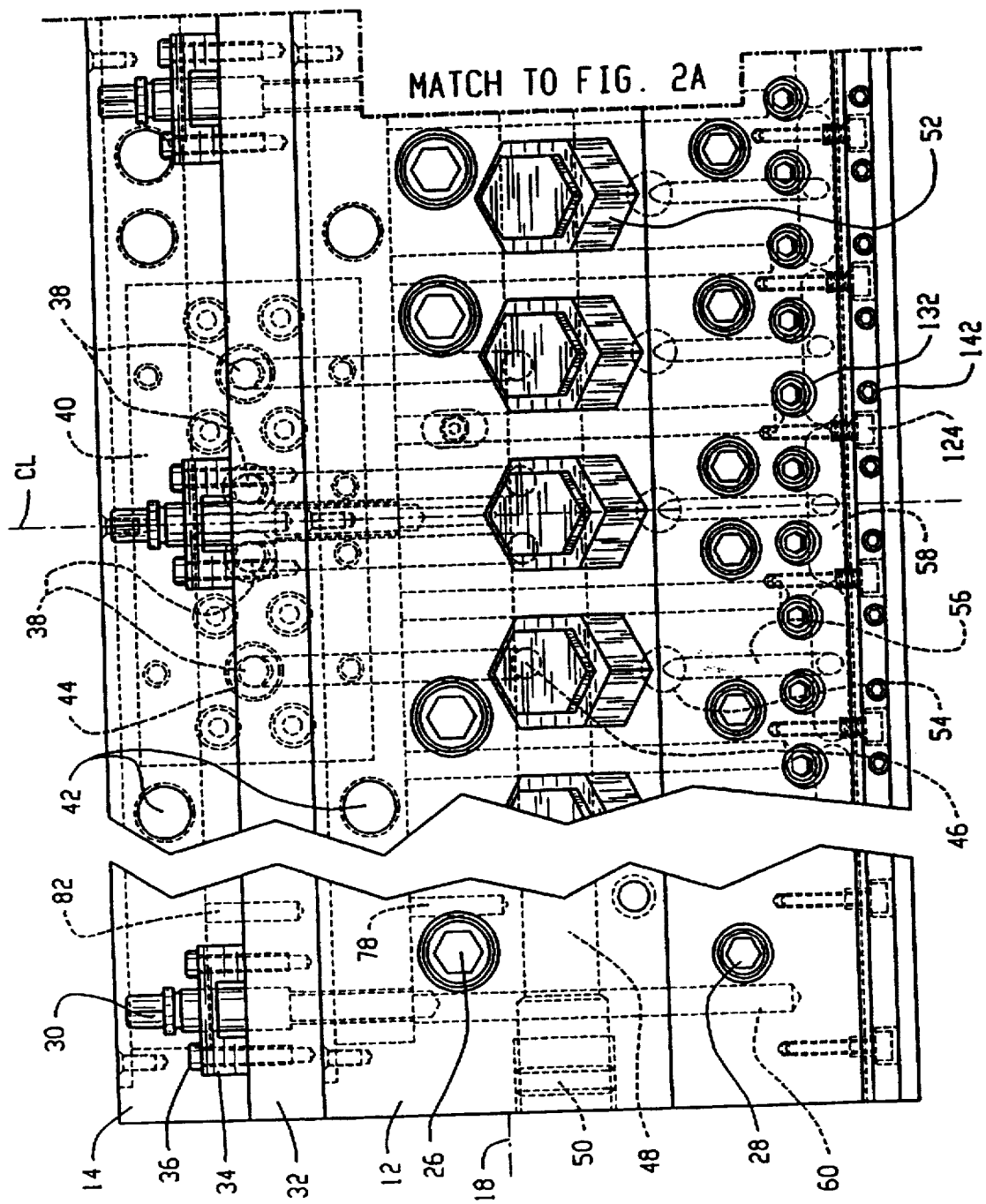
Figure 4B:
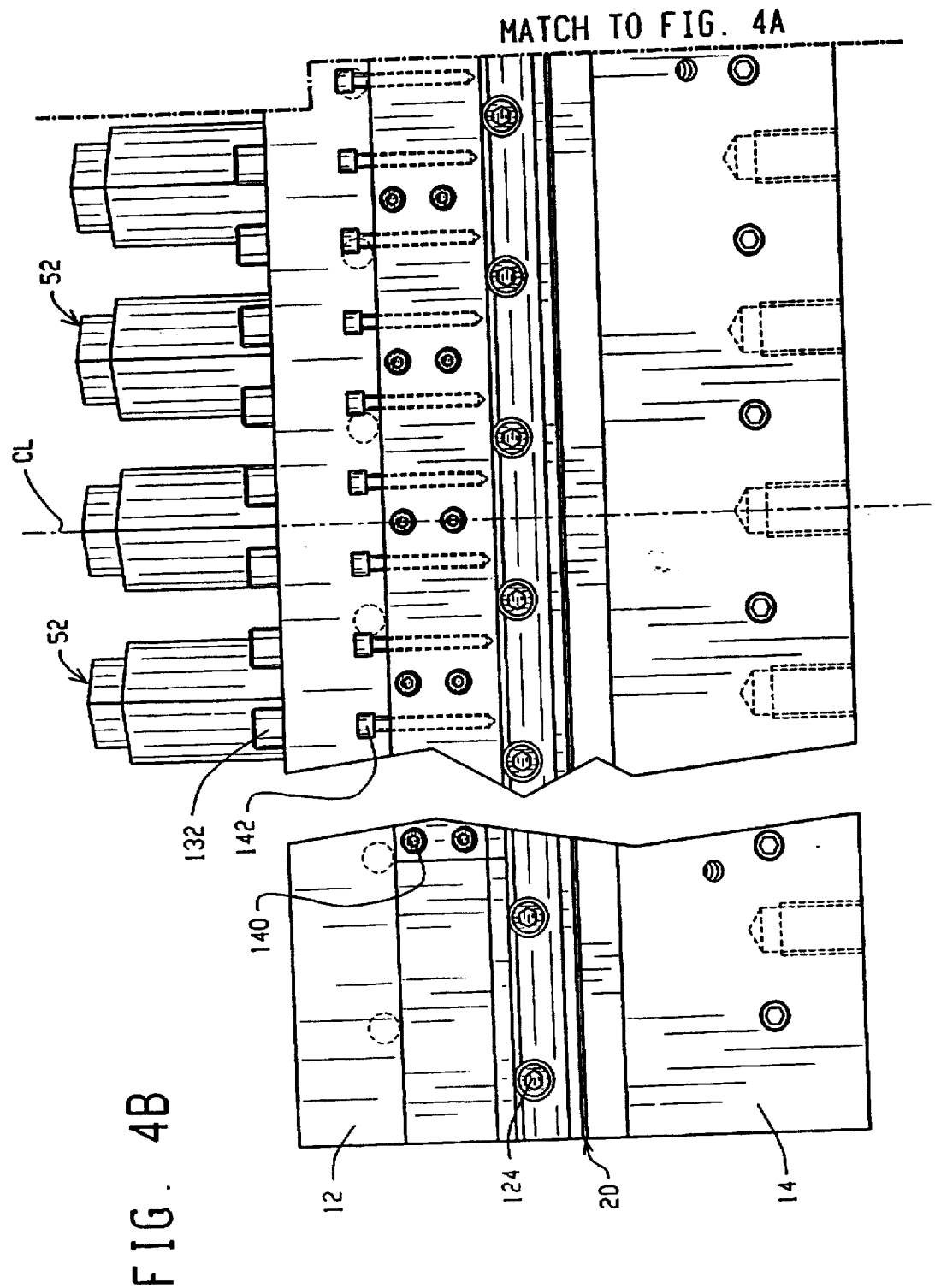

The upper and lower halves of the die are disposed in a generally parallel relationship with respect to one another along an end-to-end axis 18 of the die which lies in the plane of the shim 16 separating the die halves (see FIGS. 2A–2B). The distance separating the upper and lower die halves, which is provided by the predetermined thickness of the shim 16, forms a die opening 20. The die opening 20 extends substantially the entire end-to-end (i.e. cross-web) width of the die in the direction of the axis 18, and provides the means by which hot melt material may be dispensed by or extruded through the die. The term "hot melt material", as used broadly herein, includes thermoplastic adhesives, thermoplastic resins, reactive adhesives such as polyurethanes (PUR), high performance adhesives, and other materials having a softening or melting point above 100 degrees F.

The die opening 20 is located at the front of the die, which is designed to face a substrate to be coated with hot melt material. The front of the upper die half 12 is provided with a fixed insert (i.e. mouthpiece) 22 which, along with the front of the lower die half 14 forms the opening 20. The mouthpiece 22 is provided with mouthpiece adjustment means 23 which are shown in more detail in FIG. 6A. The frontmost portion of the mouthpiece 22 forms a doctoring surface 24 which works, or doctors, the finish and thickness of the hot melt material as it is being applied to the substrate.

The upper and lower die halves are connected by means of threaded body bolts 26 and 28, the heads of which are shown in FIGS. 2A–2B. FIGS. 2A and 2B provide a broken view of the of a side view of the upper die half. The missing portion of the die not shown in FIG. 2B may be ascertained from FIG. 2A, as the die is symmetrical about die centerline $C_L$ (with the exception of a single alignment key as will be explained later). As shown in FIGS. 2A and 2B, a plurality of each of the threaded body bolts 26, 28 are positioned along the end-to-end width of the die to secure the upper and lower die halves together. Although only a broken view is shown in FIGS. 2A and 2B, in one preferred embodiment of the invention eighteen bolts 26 and sixteen bolts 28 are provided for this purpose. Each of these bolts passes entirely through the upper die half 12 and partially through the lower die half 14. The bolts are tightened to secure the die halves together.

A series of push-pull bolts 30 are located along the back of the die 10 (opposite the front), also running along the end-to-end width of the die. The push-pull bolts are used to adjust the relative position of the upper half of the die with respect to a substrate to be coated along the width of the die. Because the position of the mouthpiece 22 is fixed with respect to the upper die half 12, adjustment of the push-pull bolts 30 also adjusts the position of the mouthpiece with respect to substrate along the entire end-to-end width of the die.

The push-pull bolts 30 are mounted to a projection or lug 32 in the lower die half by means of a bracket 34 and mounting screws 36. The mounting screws 36 pass only through the bracket 34 and into the lug 32, and therefore the position of the bracket is fixed with respect to the lower die half 14. The push-pull bolts 30, however, pass entirely through the lug and into the body of the upper die half 12. As is known in the die-making art, threads in the lug 32 and in the upper die half 12 are cut such that rotation of a particular push-pull bolt 28 in one direction pushes the upper die half away from the lug, and rotation in an opposite direction pulls the upper die half toward the lug. To facilitate this manner of adjusting the positions of the upper and lower die halves with respect to each other along the end-to-end width of the die, the body bolts 26, 28 are slightly loosened before adjusting the push-pull bolts 30 and then re-tightened after adjustment of the push-pull bolts is completed.

In one preferred embodiment of the die 10, seven push-pull bolts 30 are located along the end-to-end width of the die. Selective and independent operation of individual push-pull bolts 30 may effect a coarse adjustment of the contour of the doctoring surface 24 of the mouthpiece 22 along the entire end-to-end width of the front of the die. Such adjustment of the doctoring surface is necessary to accommodate variations in the thickness of the substrate being coated, or in the surface of a back-up roll (not shown) over which the substrate passes during the coating process, or to accommodate manufacturing variations in the uniformity of either or both the upper die half 12 or the mouthpiece itself.

Referring back to FIG. 1, the path by which hot melt material flows through the die 10 to the die opening 20 is shown in phantom. A supply of hot melt material (not shown) is provided to the lower die half 14 by means of four input lines (also not shown). Of course, other input line configurations comprising more or less than four lines are contemplated. A filter may be provided at the end of the lines nearest the die for filtering impurities and particulate matter from the supply of hot melt material. These four input lines mate with four corresponding tubular channels 38 which are machined or drilled into the lower die half 14 and which extend transversely throughout the entire lower die half. The input lines and the filter are attached to the lower half of the die by means of a filter base plate 40 by means of eight threaded screws 42. Seals such as Teflon O-rings 44 (FIG. 2B) are provided at the interface of the filter base plate and the entrance of each of the tubular channels 38 in the lower die half to prevent leakage of the hot melt material at this interface.

The hot melt material flows through the four tubular channels 38 and into four corresponding tubular channels 46 which are machined or drilled into the upper die half 12. The four tubular channels 38 and corresponding tubular channels 46 are aligned with each other by the bolts 26, 28 which secure the upper and lower die halves together, and by additional alignment mechanisms described later herein. The tubular channels 46 extend horizontally from the upper die half—lower die half interface to a cylindrical cross channel 48 in the upper die half 12. The cross channel 48 extends the entire width of the upper die half and communicates with each of the four tubular channels 46. Caps 50 are provided to seal the ends of the cross channel to protect hot melt material contained therein from the outside environment.

The hot melt material provided to the cross channel 48 by the tubular channels 46 pass through a series of adjustable flow control valve assemblies 52 in the upper die half 12. Each of the valve assemblies taps into the supply of hot melt material in the cross channel 48 and regulates the flow of hot melt material exiting the valve assembly at a corresponding exit port 54 in the upper die half 12. Fifteen such valve assemblies are provided in one preferred embodiment of the invention (shown in more detail in FIGS. 7–10). The fifteen corresponding exit ports 54 in the upper die half 12 align with fifteen corresponding elbow-channels 56 which are machined or drilled in the lower die half 14. Of course, other valve assembly/exit port configurations comprising more or less than 15 valves/port combinations are contemplated. The number of valve/port combinations depends on the particular application, and is chosen to provide the required uniformity of the hot melt material.

Each of the elbow-channels 56 in the lower die half 14 is L-shaped and terminates in an elongated slot 58 with rounded ends which is machined in an inner flow surface of the lower die half, facing the shim 16. The entrance angle of the elbow-channels 56 to the elongated slots 58 is between 45 and 135 degrees, and preferably about 90 degrees, to insure even flow of hot melt material therethrough. The fifteen slots 58 extend in the direction of the axis 18 on either side of the elbow-channels 56. Each slot 58 and the portion of each elbow-channel nearest the groove form a T-shape (hence the term "T-slot" die). Hot melt material flows from the elbow-channels, through the series of adjacent T-slots formed by the grooves 58, and through the die opening 20 to provide an evenly distributed flow of hot melt material across the opening. As explained later herein with reference to FIG. 5, the shim 16 provides means by which the flow of hot melt material present at the T-slots may be selectively blocked to provide a predetermined pattern or variable width of hot melt material flow at the die opening 20.

In order to insure that the hot melt material flows smoothly and consistently through the upper and lower die halves, heater cartridges 60, 62 are installed in cylindrical cavities in each of upper and lower die halves, respectively. In one preferred embodiment, eighteen cartridge heaters are installed in eighteen corresponding cavities in each of the upper and lower die halves.

The heater cartridges 60, 62 are connected to appropriate power wires in wiring boxes 61 and 63 which are covered by cover plates 64 and 66, respectively. Cover plate 64 is secured to the upper die half by screws 68 and cover plate 66 is secured to the lower die half by screws 70 (see also FIGS. 3A–3B). Electrical wiring is run to the heater cartridges 60 by means of flexible conduit 72, and to the heater cartridges 62 by means of flexible conduit 74. Heat is radiated from each of the heater cartridges 60 throughout the upper die half 12, and temperature is sensed by a thermocouple sensor disposed in a corresponding thermocouple channel 78. Heat is radiated from each of the heater cartridges 62 throughout the lower die half 14, and temperature is sensed by a thermocouple sensor disposed in a corresponding thermocouple channel 82. Plugs 84 are provided at each of the front ends of the heating cartridges 62.

On the upper die half 12, threaded holes 94 are provided for die mounting purposes. In addition, one or more eye bolts 96 may be provided on brackets 98 attached to the upper die half by means of threaded bolts 100. The eye bolts 96 enable the die to be easily transported by hoisting machinery. The brackets 98 may also be provided with mounting holes 102. Finally, with respect to FIG. 1, a pair of set screws 104 are accessed by means of access holes 106 drilled into to the upper die half 12. The set screws 104 are used to separate the die halves from one another upon disassembly of the die 10 by turning the set screws 104 clockwise, thereby forcing the set screws against the body of the lower die half 14 at the location of recess 108 to separate the die halves from one another.

FIGS. 3A–3B and 4A–4B form back and front views, respectively, of the adjustable slot coating die described above. Each of the elements shown in these Figures has been previously discussed, or, with respect to the mouthpiece adjustment means 23, will be discussed in more detail with reference to FIG. 6A. Like FIGS. 2A–2B, FIGS. 3A–3B and 4A–4B are symmetrical about the die centerline $C_L$.

Figure 5A:
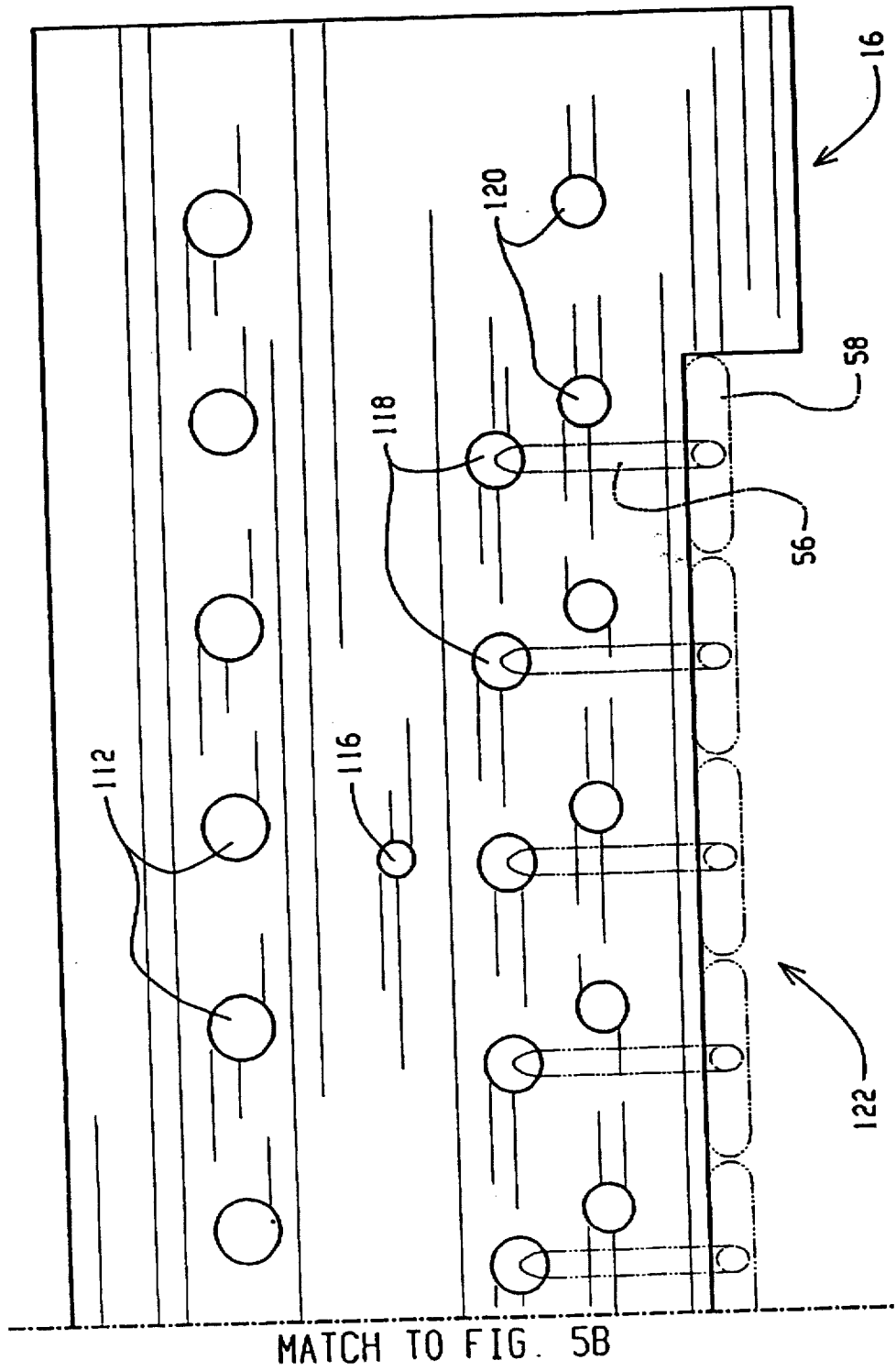
FIGS. 5A and 5B, taken together, form a side view of the shim disposed between the upper and lower die halves of the slot coating die of FIG. 1.
Figure 5B:
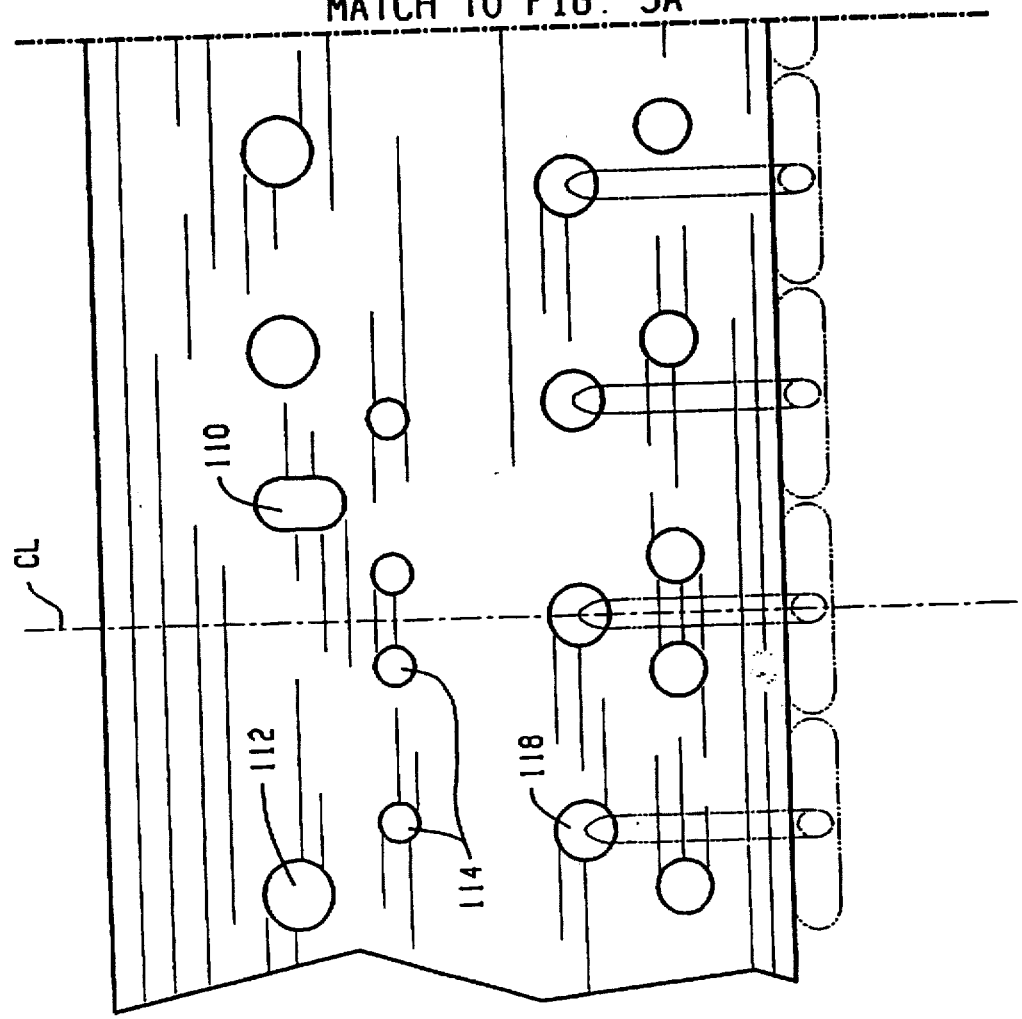

FIGS. 5A–5B form a side view of the shim 16 disposed between the upper and lower die halves. Again, with the exception of an oval-shaped hole 110 (FIG. 5B), the shim is symmetrical about die centerline $C_L$. Working down the shim 16 from the back (top of page) to the front (bottom of page), holes 112 are provided which align with body bolts 26 (for a better understanding of holes 112–120, refer back to FIG. 1). Four holes 114 (FIG. 5B) are provided which align with the tubular channels 38 in the lower die half 14 and the tubular channels 46 in the upper die half 12. A pair of holes 116 (FIG. 5A) are provided through which alignment dowels may be inserted. Holes 118 are provided which align with the exit ports 54 in the upper die half 12 and the elbow-channels 56 in the lower die half 14. Lastly, holes 120 are provided which align with body bolts 26.

The T-slots formed by the slots 58 and the elbow-channels 56 are shown in phantom in FIGS. 5A–5B. As explained above with reference to FIG. 1, the shim 16 may also provide means by which the flow of hot melt material present at the T-slots may be selectively blocked to provide a predetermined pattern or variable width of hot melt material flow at the die opening 20. As shown in FIGS. 5A–5B, none of the T-slots is blocked. Thus, the shim plate configuration shown, in which a single continuous slot extension 122 at the front of the shim exposes each of the T-slots to the die opening 20, provides a continuous, evenly distributed flow pattern from one end of the die to the other. The number and width of the slot extensions determines the flow pattern of the hot melt material which is applied to the substrate through the opening 20. Virtually any type of flow pattern is possible with the die 10 merely by replacing the shim 16.

Figure 6A:
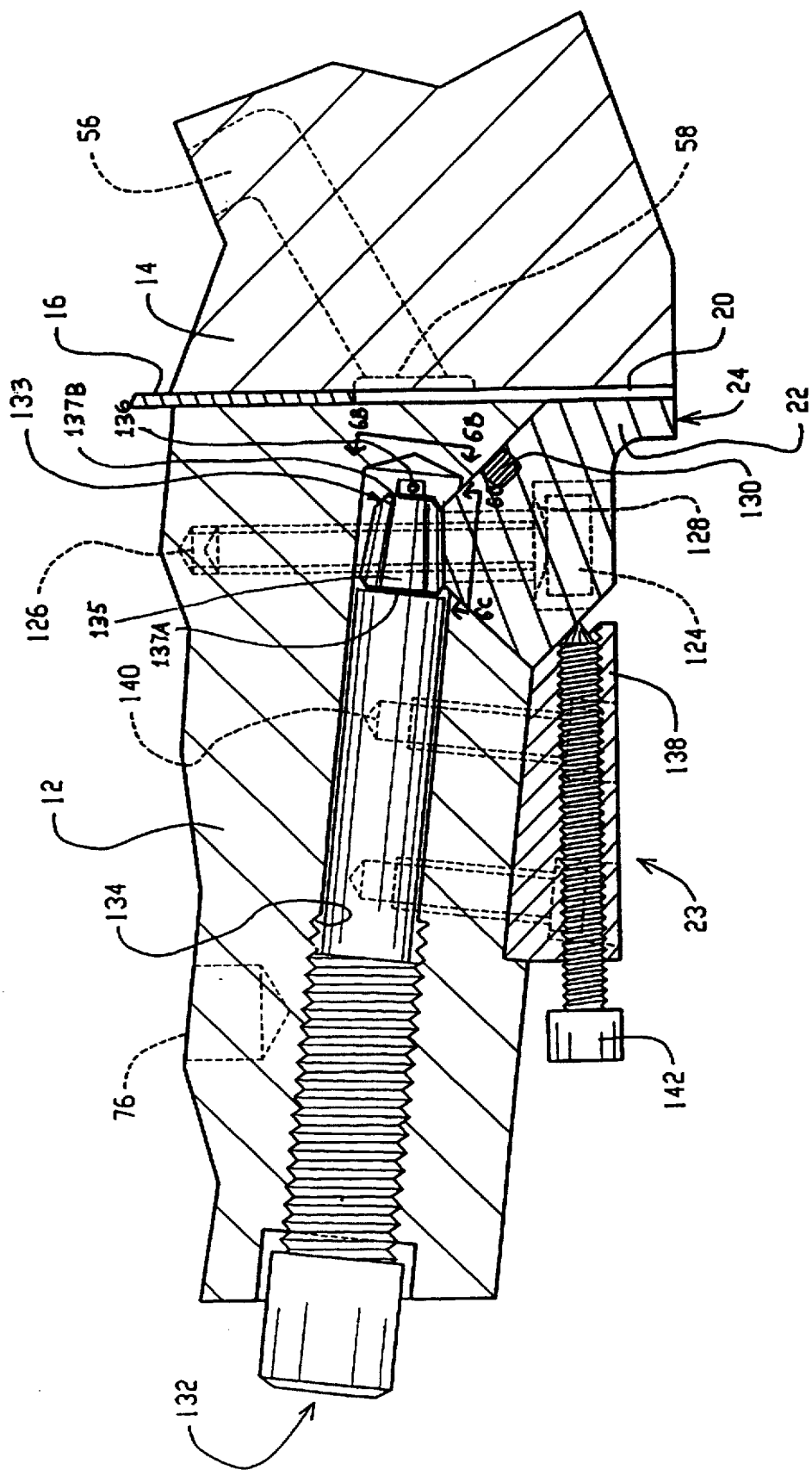
FIG. 6A is a detailed, partial sectional view of one end of the slot coating die of FIG. 1.

The mouthpiece adjustment means 23 referenced in FIG. 1 is shown in greater detail in FIG. 6A. The mouthpiece 22 is secured to the upper die half 12 by means of a series of threaded screws 124 which are screwed into corresponding threaded holes 126 evenly spaced along the end-to-end width of the die. A spring 128 such as a Belleville washer surrounds the shaft of each of the screws 124 between the head of the screw and the mouthpiece 22. Thus, when a screw 124 is tightened to an extent that the spring 128 is under compression, the compressive force exerted by the spring forces the mouthpiece 22 into contact with the upper die half 12 at that particular location. A long, thin cylindrical elastomer strip 130 extends the entire end-to-end width of the die and provides a seal between the mouthpiece 22 and the upper die half 12.

A series of screws 132 having tapered, friction-resistant end elements 133 are used to finely adjust the position of the mouthpiece 22 with respect to the substrate or web being coated along the end-to-end width of the die. The screws 132 are installed in threaded holes 134 in the upper die half 12. The friction-resistant end element 133 is formed as a sleeve which fits over an end portion 135 of the screw 132.

Figure 6B:
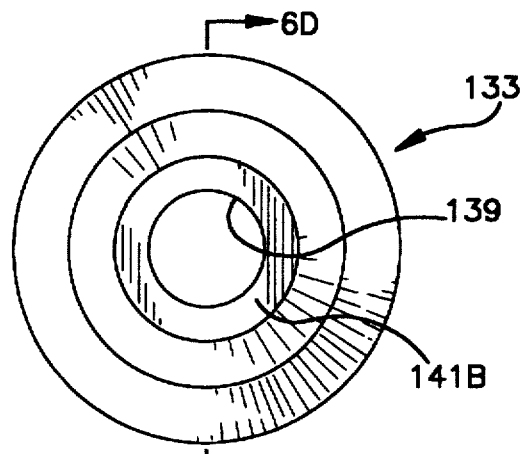
FIG. 6B is a partial, sectional side view of a portion of the slot coating die shown in FIG. 6A, taken along the line 6B—6B, showing a side of an end element used to adjust the position of the die mouthpiece.
Figure 6C:
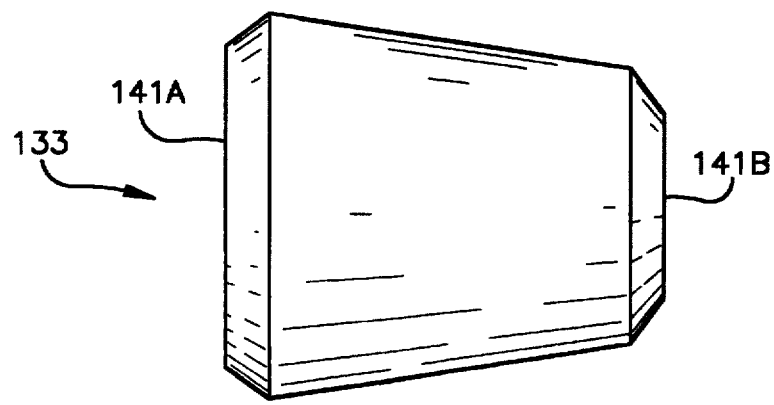
FIG. 6C is a partial, sectional frontal view of a portion of the slot coating die shown in FIG. 6A, taken along the line 6C—6C, showing a tapered front of the end element shown in FIG. 6B.
Figure 6D:
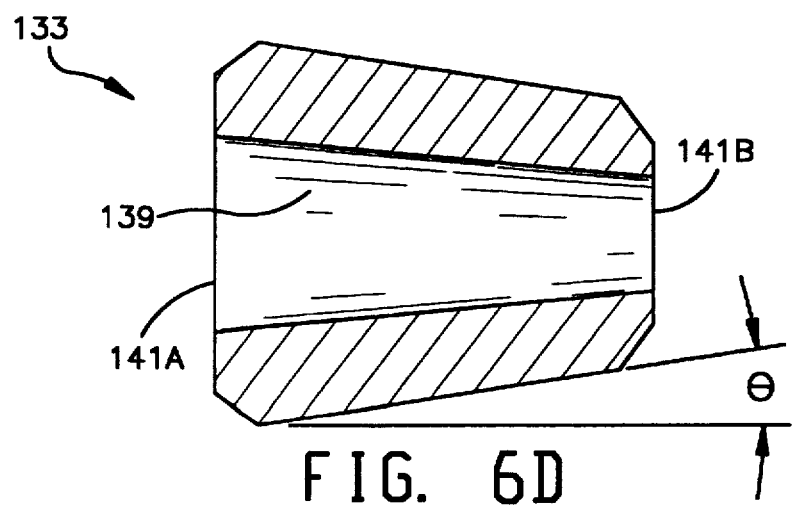
FIG. 6D is a sectional view of the end element shown in FIG. 6B, taken along the lines 6D—6D.

A more detailed view of one of the friction-resistant end elements 133 is shown in more detail in FIGS. 6B through 6D. Each end element 133 is formed generally in the shape of a block having a hole 139 therein for receiving the end portion 135 of a screw 132. The friction-resistant end element is free to rotate about the end portion 135. A dowel pin 136 inserted in a corresponding hole in the end portion 135 maintains the position of the friction-resistant end element on the end portion 135. Washer 137A is positioned between one end of the friction-resistant end element 135 and the body of the screw 132, and washer 137B is positioned between the opposite end of the friction-resistant end element 135 and the dowel pin 136 (see FIG. 6A).

Preferably, the friction-resistant end elements 133 are formed of steel and are coated with a friction-resistant coating such as TEFLON®. The front side 141A of each end element mates with the mouthpiece 22, and is tapered toward the dowel pin 136 along the axis of the hole 139 (see FIG. 6D). The entire coated surface 141A provides a generally flat surface which contacts the mating surface of the mouthpiece. The back side 141B of the end element 133 opposite the front side 141A is also preferably tapered.

By turning a screw 132 clockwise, the screw is drawn further into the upper die half 12, and the tapered front side 141A of the end element is forced against the corresponding surface of the mouthpiece 22. As a result, the compressive force of the spring 128 is overcome to force the mouthpiece 22 away from the upper die half at that particular location. The degree θ of taper of the end element determines the distance that the mouthpiece will move in response to the rotation of the screw 132. The range of fine adjustment of the mouthpiece at each screw location is limited by the respective configurations of the spring 128 in its fully loaded and unloaded states.

Alternatively, instead of providing the friction-resistant end elements 133 for each of the screws, the ends of the screws themselves may be tapered. In this manner, the washers 137A and 137B and the dowel pin 136 may also be eliminated. The tapered portion of the screws 133 in this case mate directly with the mouthpiece 22. In this respect, as used herein, "tapered portion" shall include both a tapered screw 132 and a screw having a tapered end element 133 located thereon.

The mouthpiece mounting screws 124 are tightened until each of the springs 128 enters a state of compression, thereby forcing the mouthpiece 22 into contact with the upper die half 12 along the entire end-to-end width of the die. Once a coarse adjustment of the contour of the doctoring surface 24 of the mouthpiece 22 along the entire width of the front of the die is effected by selective operation of the individual push/pull bolts 30, as described above, fine adjustment of the doctoring surface may be accomplished as follows. The screws 132 may be selectively and independently tightened to adjust the doctoring surface 24 of the mouthpiece 22 along the entire width of the die.

Once the fine adjustment of the doctoring surface 24 is complete, a series of optional locking clamps 138 may be installed on the front of the upper die half 12 by means of screws 140. The clamps 138 provide additional rigidity for die at the location of the mouthpiece 22. A locking screw 142 in each clamp is then tightened to lock the position of the mouthpiece 22 with respect to the upper die half 12 along the width of the die.

Figure 7:
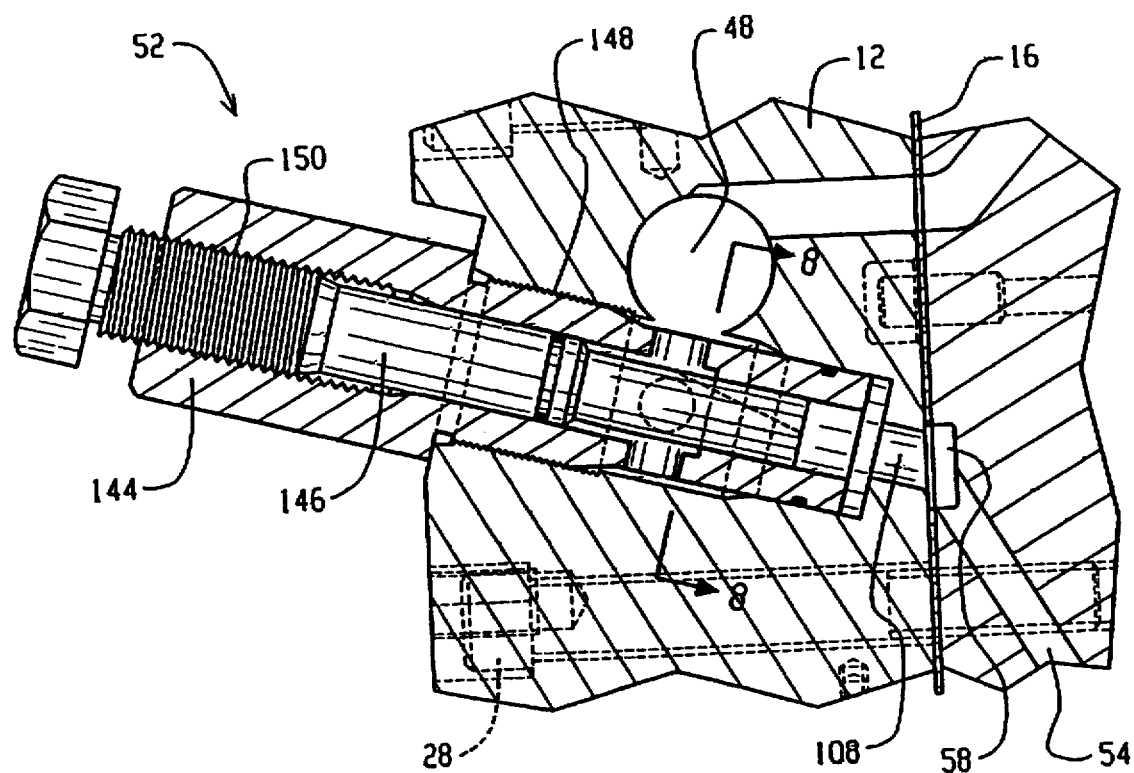
FIG. 7 is a first detailed, partial sectional end view of a flow control valve assembly forming part of the upper die half of the slot coating die of FIG. 1.
Figure 8:
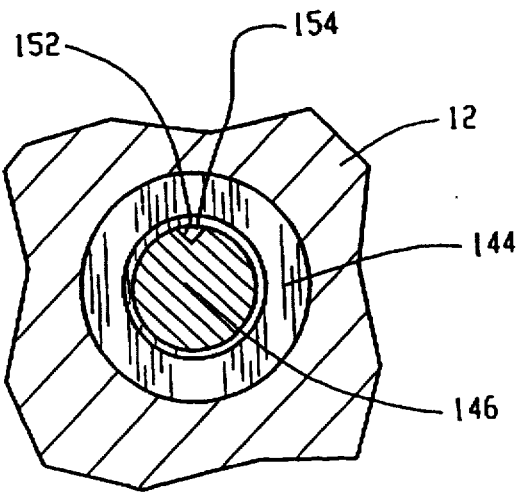
FIG. 8 is a detailed, partial sectional view of the valve assembly of FIG. 7, taken along the line 8—8.
Figure 9:
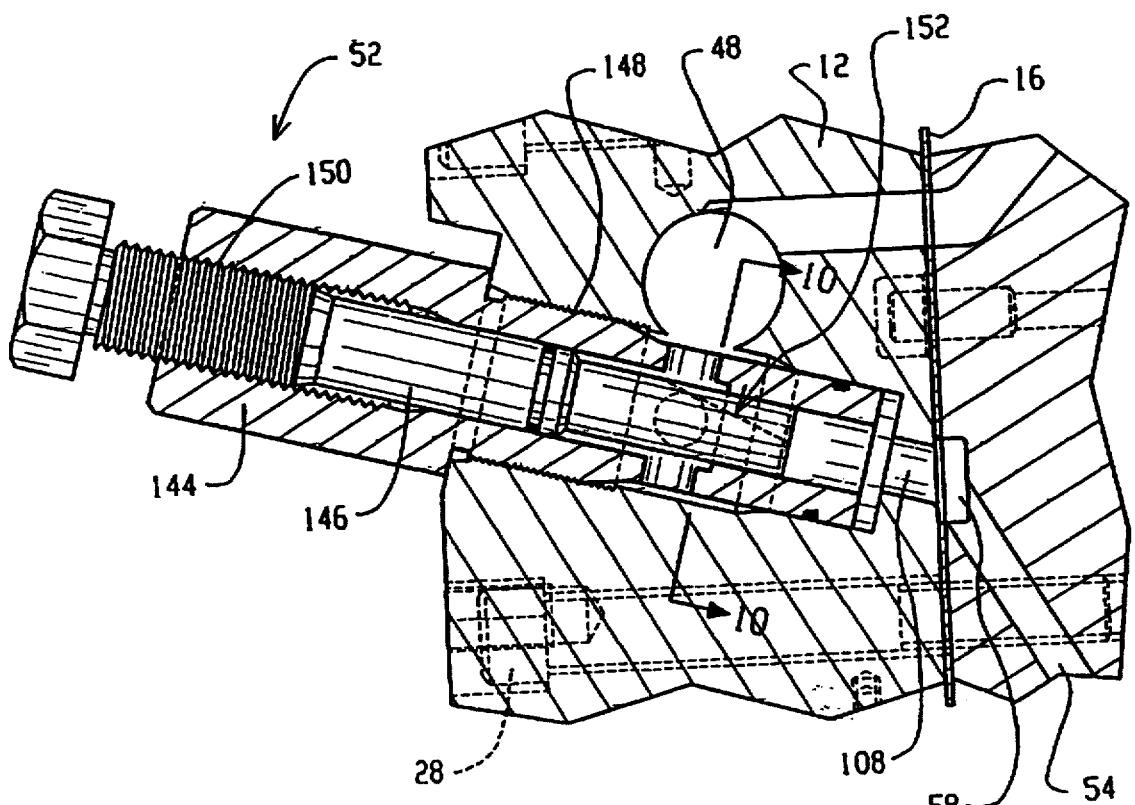
FIG. 9 is a second detailed, partial sectional end view of a flow control valve assembly forming part of the upper die half of the slot coating die of FIG. 1, showing the valve in a more open configuration than that shown in FIGS. 7 and 8.

FIGS. 7–10 show the construction of the adjustable flow control valve assemblies 52 in more detail. As shown in FIGS. 7 and 9, The valve assemblies 52 each comprise a valve body 144 and a spool 146 which fits inside the body. The position of the body 144 is fixed within the upper die half 12 by a threaded coupling 148. The spool is made movable in and out of the body 144 by means of a threaded coupling 150 which enables the spool to be drawn into and out of the body 144.

The spool 146 is provided with a V-notch 152 which communicates with the cross channel 48. Hot melt material flows from the cross channel 48, through an opening 154 formed by the V-notch 152, and into the exit port 108 associated with that valve assembly. The flow rate is metered by the effective cross sectional area of the opening 154 which is in communication with cross channel, as determined by the position of the spool 146 within the body 144.

Figure 10:
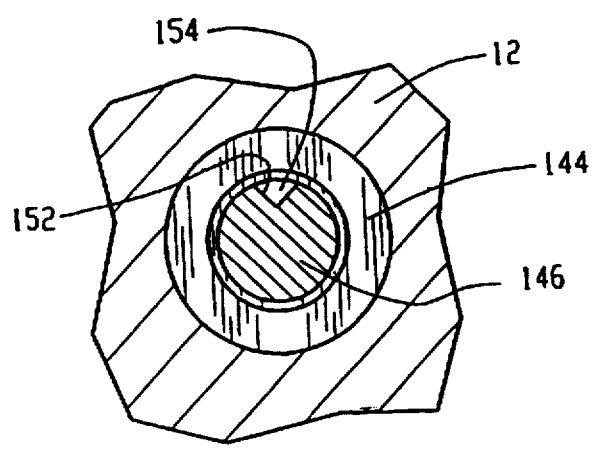
FIG. 10 is a detailed, partial sectional view of the valve assembly of FIG. 9, taken along the line 10—10.

FIGS. 8 and 10 show the effective cross sectional area of the opening 154, based on the positions of the spool 146 within the body 144 as shown by FIGS. 7 and 9, respectively. As shown in FIG. 8, the cross sectional area of the opening 154 is relatively small because the spool is drawn well inside the body, thereby reducing the effective cross sectional area of the opening 154 which is in communication with cross channel 48. As shown in FIG. 10, the cross sectional area of the opening 154 is larger than that shown in FIG. 8 because the spool is withdrawn further outside the body, thereby increasing the effective cross sectional area of the opening 154 which is in communication with cross channel 48. In this manner, the valve assemblies 152 may be individually adjusted to regulate the flow of hot melt material which is eventually supplied to the die opening.

Accordingly, the preferred embodiment of an adjustable slot coating die has been described. With the foregoing description in mind, however, it is understood that this description is made only by way of example, that the invention is not limited to the particular embodiments described herein, and that various rearrangements, modifications and substitutions may be implemented without departing from the scope of the invention as hereinafter claimed.

We claim:

1. A lip insert adjustment mechanism (23) for adjusting the position of a removable lip insert (22) with respect to the front of a coating die (10) to which it is attached, the coating die extending along an axis (18), the removable lip insert being movable toward and away from the front of the die in a direction generally perpendicular to the axis, said lip insert adjustment mechanism comprising:

a plurality of spring (128) loaded screws (124) spaced along said front of said die at spaced apart locations along the width thereof, wherein a compressive force exerted by each of said springs forces the lip insert toward the die at that particular spaced apart location; and a corresponding plurality of screws (132) at said spaced apart locations, each screw having an end element (133) in contact with said lip insert, wherein said end element has a friction-resistant coating and fits over a dowel pin which extends from an end portion (135) of said screw (132), whereby rotation of each of said screws in one direction counteracts said compressive force exerted by a corresponding spring to force the lip insert away from the die at a particular spaced apart location.

2. The lip insert adjustment mechanism (23) of claim 1, further comprising a clamp (138) for securing the position of said removable lip insert (22) with respect to said die (10).

3. The lip insert adjustment mechanism (23) of claim 2, further comprising a locking screw (142) in each clamp (138).

4. The lip insert adjustment mechanism of claim 1, wherein said end element (133) is coated with a friction-resistant coating.

5. The lip insert adjustment mechanism of claim 1, wherein said end element (133) has a generally flat surface which contacts said lip insert.

6. The lip insert adjustment mechanism of claim 1, wherein the tapered portion is tapered to a degree $\theta$, wherein the degree $\theta$ of taper determines a distance the lip insert will move in response to rotation of at least one of said screws.

7. A lip insert adjustment mechanism (23) for adjusting the position of a removable lip insert (22) with respect to the front of a coating die (10) to which it is attached, the coating die extending along an axis (18), the removable lip insert being movable toward and away from the front of the die in a direction generally perpendicular to the axis, said lip insert adjustment mechanism comprising:

a plurality of spring (128) loaded screws (124) spaced along said front of said die at spaced apart locations along the width thereof, wherein a compressive force exerted by each of said springs forces the lip insert toward the die at that particular spaced apart location; and a corresponding plurality of screws (132) at said spaced apart locations, each screw having a tapered portion in contact with said lip insert, wherein rotation of each of said screws in one direction counteracts said compressive force exerted by a corresponding spring to force the lip insert away from the die at that particular spaced apart location, wherein said tapered portion includes an end element (133) which fits over an end portion (135) of said screw (132).

8. The lip insert adjustment mechanism of claim 7, wherein said end element (133) is coated with a friction-resistant coating.

9. The lip insert adjustment mechanism of claim 7, further comprising a member (136) for maintaining the position of said end element (133) on said end portion (135) of said screw (132).

10. The lip insert adjustment mechanism of claim 7, wherein said tapered portion of said end element (133) is a generally flat surface which contacts said lip insert.

* * * * *